United States Patent
Rose et al.

(10) Patent No.: US 7,386,494 B1
(45) Date of Patent: Jun. 10, 2008

(54) METHOD AND APPARATUS FOR RECEIVING A SUBSCRIPTION FOR A SECURITY

(75) Inventors: Keith Rose, Danville, CA (US); Karin Riley, San Carlos, CA (US); Coreen Kaplan, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 09/502,313

(22) Filed: Feb. 11, 2000

(51) Int. Cl.
*G06Q 40/00* (2006.01)

(52) U.S. Cl. .......................... 705/36 R; 705/39; 705/35

(58) Field of Classification Search ............ 705/35–40, 705/1
See application file for complete search history.

(56) References Cited

U.S. PATENT DOCUMENTS

| | | | |
|---|---|---|---|
| 6,901,383 B1* | 5/2005 | Ricketts et al. ............ 705/36 R |
| 2001/0034641 A1* | 10/2001 | D'Amico et al. ............. 705/12 |
| 2001/0034690 A1* | 10/2001 | Joseph ........................ 705/37 |
| 2002/0016756 A1* | 2/2002 | Rinaldi ........................ 705/36 |
| 2003/0135457 A1* | 7/2003 | Stewart et al. ............... 705/39 |

* cited by examiner

*Primary Examiner*—Hani M. Kazimi
*Assistant Examiner*—Olabode Akintola
(74) *Attorney, Agent, or Firm*—Innovation Partners; Charles E. Gotlieb

(57) ABSTRACT

A method and apparatus provides on a home page of a web site information about a mutual fund subscription and a link which may be followed to a web page which may be used to subscribe to the fund online.

16 Claims, 2 Drawing Sheets

METHOD AND APPARATUS FOR RECEIVING A SUBSCRIPTION FOR A SECURITY

FIELD OF THE INVENTION

The present invention is related to computer software, and more specifically to computer software for investing using the Internet.

BACKGROUND OF THE INVENTION

Mutual funds allow investors to invest in a basket of two or more securities that are managed by the mutual fund manager. The securities in the mutual fund may be selected by the manager using the manger's skill, or may be selected using a fixed criteria, such as the conventional S&P 500 index. When a mutual fund is operating, its share price may fluctuate with the value of the securities in the fund.

Before a mutual fund begins operating, investors may be allowed to subscribe to the fund. To subscribe to the fund, an investor commits a certain amount of money to the fund or commits to buying a certain number of shares in the fund in advance of its operation. The period during which such commitments are allowed is known as the subscription period. When the fund begins operating at the end of the subscription period, the investor purchases shares of the fund at its opening price.

When a broker is used to subscribe to a mutual fund, the broker informs the fund manager, usually prior to the operation of the fund, how many investors have subscribed to the fund and how much money they have committed. If the opening share price is fixed in advance, the broker may inform the fund manager of the number of shares to which investors have subscribed in place of the amount of money committed.

Conventional brokers have salespeople who solicit such subscriptions to their investors, using conventional methods such as placing telephone calls or mailing direct mail materials. Investors subscribe over the telephone, or by using a reply card received with the direct mail materials or in person at the broker's office. However, the cost of such solicitations is relatively high because the response rate of such a solicitation is relatively low. The cost of a mailing may be less than the cost of a telephone solicitation, however because the potential investor must take the time and effort to respond, the response rate may be far lower than the response rate of a telephone solicitation, making both forms of solicitation prohibitively expensive. Such costs can drive up the costs of subscriptions, which can limit the availability of new funds.

Many investors use online brokerage services. An online brokerage service may allow an investor to subscribe to a mutual fund before its operation by filling in one or more online forms using a browser on a personal computer coupled to the Internet. The information is returned to the online brokerage using conventional CGI techniques. However, investors using online brokerage services may not have a relationship with a specific broker, and so a telephone call informing the investor of a new subscription to a mutual fund may not be welcome. Because many investors of an online brokerage service prefer little intrusion from the service, receiving mass mailings announcing subscription offerings may also be unwanted.

As a result, online brokerages may simply include the subscription with the other funds they sell. Because of the large number of funds that may be offered to investors using an online brokerage, a subscription offering may get lost among the dozens or even hundreds of funds the online brokerage offers to its customers. Identifying a subscription offering using an online brokerage can require the user to locate the subscription offering manually by sifting through a number of web pages describing mutual funds. To find a fund among such a wealth of information, the user has to go looking for the subscription, having heard about through another source such as an advertisement, or simply be lucky enough stumble upon information about the subscription, for example while browsing information about similar funds. Because of the time and effort and luck involved in locating subscription offerings using an online broker, subscription offerings using online brokers have had limited success.

What is needed is a method and apparatus that can inform an investor who uses an online brokerage of a subscription offering in a cost effective, minimally intrusive manner without requiring the investor to manually search for the subscription offering on the online brokerage's web site, and can allow the investor to subscribe to the mutual fund with a minimum of effort.

SUMMARY OF INVENTION

A method and apparatus places a notice of the subscription offering for a mutual fund on the home page of a web site. The notice may include a link that is capable of directing the user of the web site to a page on which the user may subscribe to the mutual fund. A summary of the amount of the user's subscription is recorded and transmitted to the mutual fund management along with similar information from other users of the web site.

Because the notice is provided on a home page of a web site, users using that home page are likely to see it, yet the method and apparatus is far less intrusive that a telephone call or direct mailing. Because following the link will take the user to a form which can be used to subscribe to the fund with a minimum of effort, users may be more likely to subscribe to the fund than if they had received a mailing. Because the cost of implementing such a notice is very low, a wide variety of new funds may be made available that could not have been offered before.

DETAILED DESCRIPTION OF A PREFERRED EMBODIMENT

Figure 1:
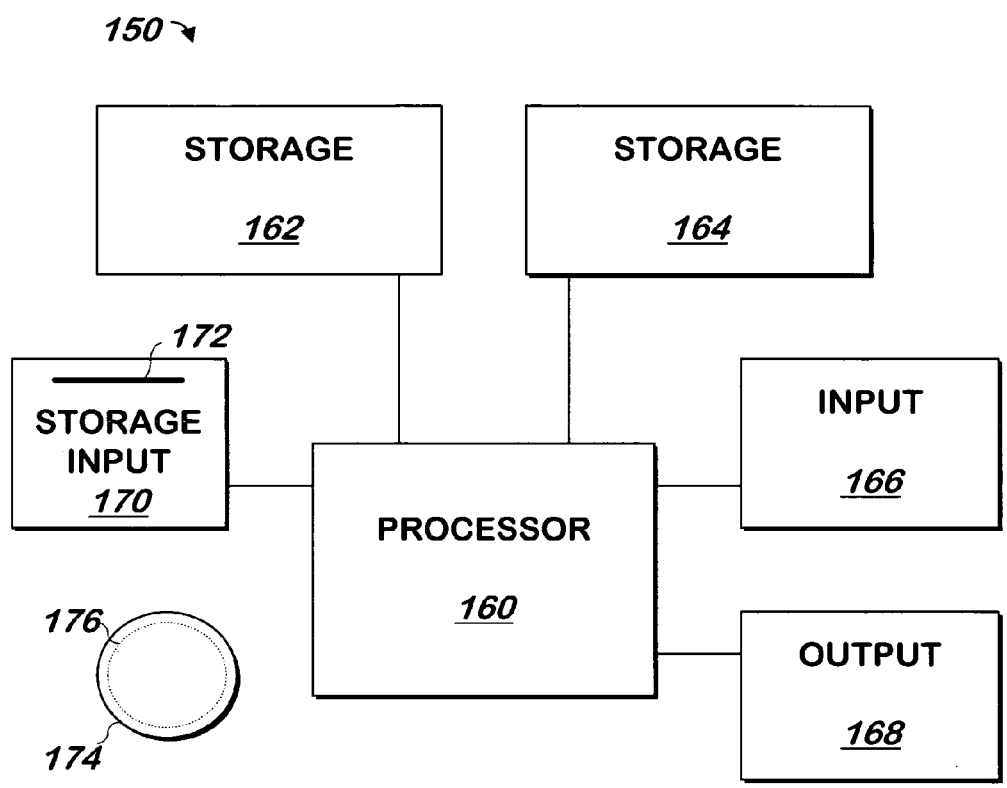
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell computer Corporation of Round Rock, Tex. running the Windows (95, 98 or NT) operating system commercially available from Microsoft Corporation of Redmond Wash. or a Macintosh computer system running the MacOS commercially available from Apple Computer Corporation of Cupertino, Calif. and the Netscape browser commercially available from Netscape Computer Corporation of Mountain View, Calif. although other systems may be used.

Figure 2:
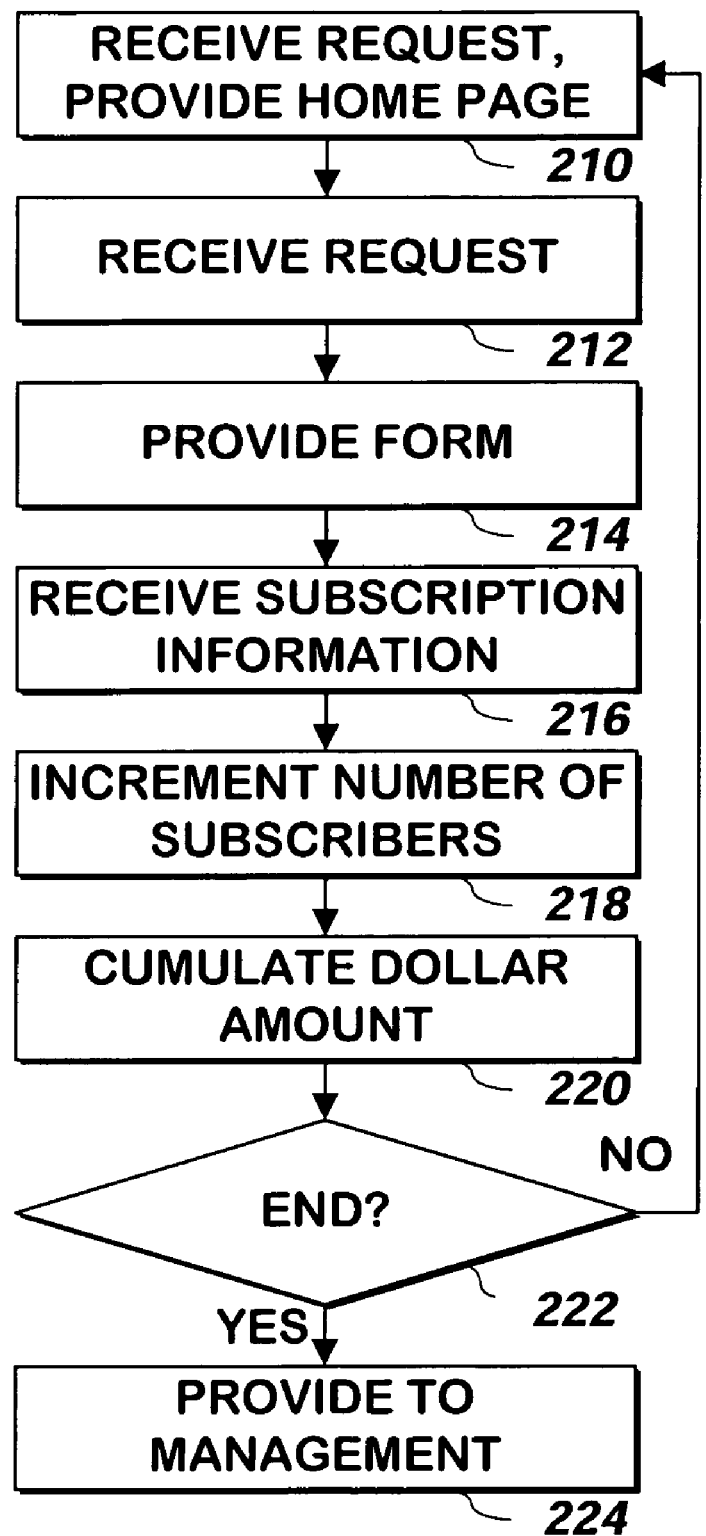
FIG. 2 is a flowchart illustrating a method of receiving a subscription to a mutual fund according to one embodiment of the present invention.

Referring now to FIG. 2, a method for receiving a subscription to a mutual fund is shown according to one embodiment of the present invention.

A home page is requested and provided 210 to the user via the Internet. A home page is a web page that a user will receive if the user types the domain name of the website without specifying a particular page or filename. For example, the address "http://www.schwab.com" will return the home page of Charles Schwab & Co., Inc., and therefore that page is a home page. The address "http://www.schwab.com/SchwabNOW/navigation/mainFrameSet/0, 4528,778, 00.html" would not be a home page unless the server that receives the request for a page at "http://www.schwab.com" is set up to return it as a default. The fact that a home page has a filename, such as index.htm or the like, does not mean it is not a home page, even though it may be accessed using the address "http://www.schwab.com/index.htm", because the use of the filename in the address is not necessary.

The home page provided in step 210 contains a notice of a subscription offering for a mutual fund or other security and a link, such as an HTML link, that the user can follow to reach a web page containing a form or other capability allowing the user to subscribe to the mutual fund before the fund is in operation. The link contains a reference to a web page, although the page to which the link refers need not be a page with which a user may subscribe to the fund.

In one embodiment, the notice contains the link. The link may be in text form, or it may be a banner similar to a conventional banner. The banner may be animated, scrolling or the like.

A request for the web page to which the link is pointing is received 212. The web page to which the link is pointing may or may not contain a form that allows the user to participate in the subscription offered in step 210, but if it is not, the page will contain a link that ultimately may be followed, for example, via one or more additional links, to such a page. A page containing a form or another type of page allowing the user to participate in the subscription offered in step 210 is provided 214 for display by a browser that may request subscription information and subscription information is received 216 using conventional CGI techniques. The subscription information may include a number of shares or a dollar amount the user wishes to pledge. Although the web page may contain form fields allowing the user to specify a number of shares, there may be buttons on the page, each specifying a different dollar amount, allowing the user to subscribe using a single click.

A number of users who have subscribed to the fund is incremented 218 and the dollar amount pledged is added to a total 220 maintained by the operator of the web site or the brokerage or other entity. Steps 218 and 220 record the cumulative total number of investors in the fund and the amount to be invested for multiple different users of the web site. Any of steps 216, 218 or 220 may include logging some or all of the subscription information along with an account number of the user and a date or date and time.

If the subscription period has ended 222, the number of subscribers in the fund or the cumulative dollar amount or both are provided 224 to the fund management. If the subscription period has not ended 222, the method continues at step 210 for the same user or for another user.

In an alternate embodiment of the present invention, step 216 may include logging the subscription information from the user, and steps 218 and 220 may follow the yes branch of step 222 using the logged information. This allows the information to be logged as it is received, but cumulated after the subscription period ends.

An apparatus may be used that implements the above steps. A home page provider may implement step 210 and a web page request receiver may implement step 212. A form provider implements step 214 and a subscription information receiver implements step 216. A subscriber incrementer implements step 218 and a dollar amount cumulator implements step 220. An information provider implements step 222 and the apparatus that implements any of steps 216-224 may implement step 222. Connections are provided between all of these elements, or only some of them as required by the information flow. An apparatus input/output may be coupled to the Internet at one end and coupled to the home page provider, form provider, and subscription information receiver. An apparatus output may be coupled to the information provider, and an output device such as a printer or a tape drive or to the Internet to communicate with the management of the fund.

What is claimed is:

1. A method of receiving a subscription to a mutual fund, the method comprising:

receiving a request for a home page, the request specifying a domain, but not explicitly specifying a file within said domain;

responsive to the request, providing the home page comprising a notice of a subscription offering and a link to a web page;

receiving a request for the web page;

providing web page information allowing a user to subscribe to the mutual fund responsive to the receiving the request for the web page;

receiving an indication of an amount of money to be invested in the mutual fund;

identifying that a subscription period for the mutual fund has ended; and providing to management of the mutual fund a number of subscribers to the mutual fund responsive to the subscription period for the mutual fund having ended, wherein the request for the web page is received by a broker;

the indication is received by the broker; and the providing step is additionally responsive to information collected by the broker before the mutual fund was in operation.

2. The method of claim 1, wherein the method additionally comprises communicating a total amount of money to be invested in the mutual fund responsive to the amount of money received.

3. The method of claim 1 wherein all of the steps are performed via the Internet.

4. The method of claim 1 wherein the web page comprises the web page information.

5. The method of claim 1 wherein the web page comprises a link that may be followed to an additional web page comprising the web page information.

6. The method of claim 1, wherein the steps of claim 1 are performed for each of a plurality of users and the method additionally comprises the steps of:

accumulating the amounts of money from each of the plurality of users; and providing to the mutual fund management the amounts of money accumulated.

7. The method of claim 1, wherein the notice comprises a banner.

8. The method of claim 7 wherein the banner comprises one selected from a scrolling banner and an animated banner.

9. A computer program product comprising a computer useable medium having computer readable program code embodied therein for receiving a subscription to a mutual fund, the computer program product comprising computer readable program code devices configured to cause a computer system to:

receive a request for a home page, the request specifying a domain, but not explicitly specifying a file within said domain;

responsive to the request, provide the home page comprising a notice of a subscription offering and a link to a web page;

receive a request for the web page;

provide web page information allowing a user to subscribe to the mutual fund responsive to the receiving the request for the web page;

receive an indication of an amount of money to be invested in the mutual fund identifying that a subscription period for the mutual fund has ended; and providing to management of the mutual fund a number of subscribers to the mutual fund responsive to the subscription period for the mutual fund having ended, wherein the request for the web page is received by a broker;

the indication is received by the broker; and the providing step is additionally responsive to information collected by the broker before the mutual fund was in operation.

10. The computer program product of claim 9, wherein the computer program product additionally comprises computer readable program code devices configured to cause the computer system to communicate a total amount of money to be invested in the mutual fund responsive to the amount of money received.

11. The computer program product of claim 9 wherein at least some of the computer readable program code devices use the Internet.

12. The computer program product of claim 9 wherein the web page comprises the web page information.

13. The computer program product of claim 9 wherein the web page comprises a link that may be followed to an additional web page comprising the web page information.

14. The computer program product of claim 9, wherein the computer readable program code devices of claim 9 are performed for each of a plurality of users and the computer program product additionally comprises computer readable program code devices configured to cause the computer system to:

accumulate the amounts of money from each of the plurality of users; and provide to the mutual fund management the amounts of money accumulated.

15. The computer program product of claim 9, wherein the notice comprises a banner.

16. The computer program product of claim 15 wherein the banner comprises one selected from a scrolling banner and an animated banner.

\* \* \* \* \*